United States Patent [19]

Stephenson

[11] Patent Number: 5,715,492
[45] Date of Patent: Feb. 3, 1998

[54] ELECTRONIC CAMERA AND ASSOCIATED PRINTER WITH LIGHT SHUTTER

[75] Inventor: Stanley W. Stephenson, Rochester, N.Y.

[73] Assignee: Eastman Kodak Company, Rochester, N.Y.

[21] Appl. No.: 792,341

[22] Filed: Jan. 31, 1997

[51] Int. Cl.⁶ .................................................. G03B 29/00
[52] U.S. Cl. ...................... 396/429; 358/302; 358/909.1; 358/906
[58] Field of Search .......................... 396/429, 430, 396/374; 358/302, 906, 909.1, 296, 401, 501; 348/207, 373, 552, 839

[56] References Cited

U.S. PATENT DOCUMENTS

| | | | |
|---|---|---|---|
| 4,768,050 | 8/1988 | Beery | 354/304 |
| 5,032,911 | 7/1991 | Takimoto | 358/76 |
| 5,049,902 | 9/1991 | Duke | 346/110 R |
| 5,122,432 | 6/1992 | Hammann et al. | 430/138 |
| 5,164,751 | 11/1992 | Weyer | 396/374 |
| 5,619,738 | 4/1997 | Petruchik et al. | 396/374 |

*Primary Examiner*—David M. Gray
*Attorney, Agent, or Firm*—Raymond L. Owens

[57] ABSTRACT

Apparatus for capturing and printing images on photosensitive sheets is disclosed. The apparatus includes a camera for electronically storing an image of a subject and having a display for displaying such stored image, and a printer including light tight storage structure for receiving a stack of photosensitive sheets. The image display is directed onto a photosensitive sheet. The printer has a printer opening disposed relative to the camera display for permitting light images from the camera to pass through the opening and expose a photosensitive surface of a photosensitive sheet and a shutter member disposed relative to the printer opening and being movable between a first sheet covering position and a second sheet exposing position. Optics focus a display area onto said photosensitive sheet and electronics provides electronic communication between the electronic camera and the printer so that the display image is imaged onto the photosensitive sheet after the shutter member is moved from its first to its second position.

7 Claims, 3 Drawing Sheets

ELECTRONIC CAMERA AND ASSOCIATED PRINTER WITH LIGHT SHUTTER

CROSS REFERENCE TO RELATED APPLICATIONS

The present invention is related to U.S. patent application Ser. No. 08/792,499 filed simultaneously herewith, entitled "Exposure Control of Camera Attached to Printer Electronic Camera", to Stephenson assigned to the assignee of the present invention. The disclosure of this related application is incorporated herein by reference.

FIELD OF THE INVENTION

The present invention relates to electronic cameras and to the printing of images produced by such cameras.

BACKGROUND OF THE INVENTION

It is known in the prior art to provide an electronic camera which uses an area image sensor. Digital images produced from the image sensors are stored in memory and these images can be shown on a display so that the user can determine which image should be stored for use in producing hard copy images. Typically, these images can be stored in a magnetic disk or a compact PCMCIA Flash RAM Card or dedicated memory within the electronic camera.

A shortcoming with prior electronic cameras is that data must be transmitted from the electronic camera to printer. Interfaces must be present to transfer the data. As disclosed in U.S. Pat. No. 5,032,911, printers that write to light sensitive media must have a structure within the printer that operates on received data and converts the data into modulated light to mark the photosensitive sheet. Many newer electronic cameras incorporate light emitting displays to view a captured image. However, the apparatus for producing images from such displays is not available for light writing onto photosensitive media.

SUMMARY OF THE INVENTION

It is an object of the present invention to make use of an electronic image display in an electronic camera to write directly onto light sensitive media which can effectively provide a hard copy.

This object is achieved by apparatus for capturing and printing images on photosensitive sheets, comprising:

(a) a camera for electronically storing an image of a subject and having a display for displaying such stored image;

(b) a printer including light tight storage means for receiving a stack of photosensitive sheets;

(c) means for imaging the display image onto a photosensitive sheet including:

(i) the printer having a printer opening disposed relative to the camera display for permitting light images from the camera to pass through the opening and expose a photosensitive surface of a photosensitive sheet;

(ii) shuttering means disposed relative to the printer opening and being movable between a first sheet covering position and a second sheet exposing position;

(iii) optical means for focusing a display area onto said photosensitive sheet; and (d) means for providing electronic communication between the electronic camera and the printer so that the display image is imaged onto the photosensitive sheet after the shutter means is moved from its first to its second position.

ADVANTAGES

A feature of this invention is that a camera display is used to directly write onto the light sensitive sheet. The printer employs a simple, inexpensive shuttering mechanism to protect and expose the media. Moreover, electronic interconnecting between the printer and the camera permits operation of the shutter sequence operation of the camera display to produce an image on the photosensitive sheet.

DETAILED DESCRIPTION OF THE INVENTION

The invention is directed to a compact printer used in conjunction with electronic cameras. Such cameras often have a flat panel color display that is used to frame and/or review capture images. Separable printers exist that receive data from said electronic capture devices. Typically, interface electronics are disposed in each device and data representing the image is transmitted from the electronic camera to the printer.

Figure 1:
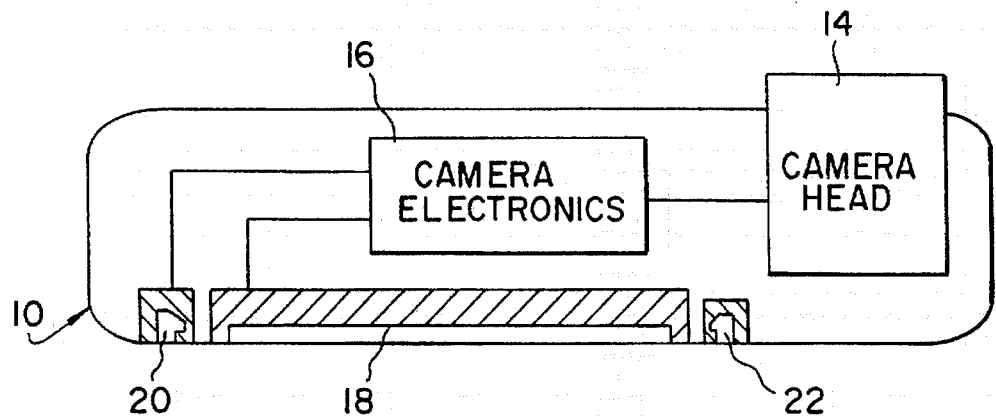
FIG. 1 is a top sectional view of an electronic camera which is adapted to be coupled to a printer in accordance with the present invention.
Figure 2:
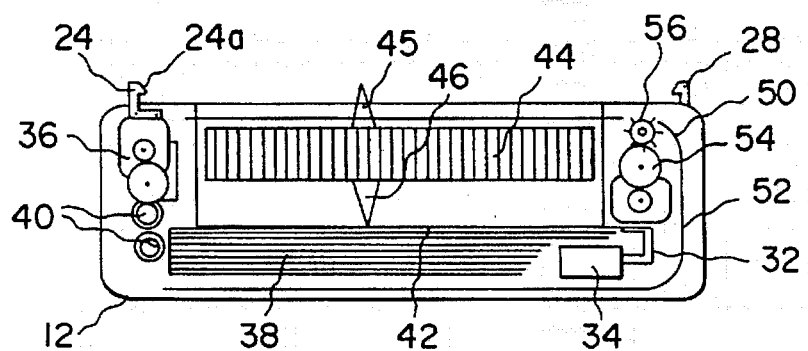
FIG. 2 is a top sectional view of the printer which is adapted to be coupled to the electronic camera of FIG. 1.

Turning now to FIG. 1, an electronic camera 10 is shown, and to FIG. 2, where a printer 12 is shown. Electronic camera 10 is of conventional design and can capture either still or motion images. The electronic camera being adapted to electronically store an image of a subject and having a camera display 18 for displaying such stored image. Images are captured by camera head 14 and transferred to camera electronics 16. Camera electronics 16 is capable of displaying still images on camera display 18. Camera display 18 can be, for instance, a LCD or organic polymer display system of conventional design.

Electronic camera 10, in accordance with the present invention, includes the additional modification of an active socket 20 and a passive socket 22 for the purpose of securing the printer 12 over camera display 18. Active socket 20 incorporates electronic sensing circuitry to communicate with printer 12. Electronic sensing circuitry can be an electrical interconnection between active socket 20 and camera electronics 16. Alternatively, a light sensing/transmitting assembly can be incorporated in or near the active socket 20.

Figure 5:
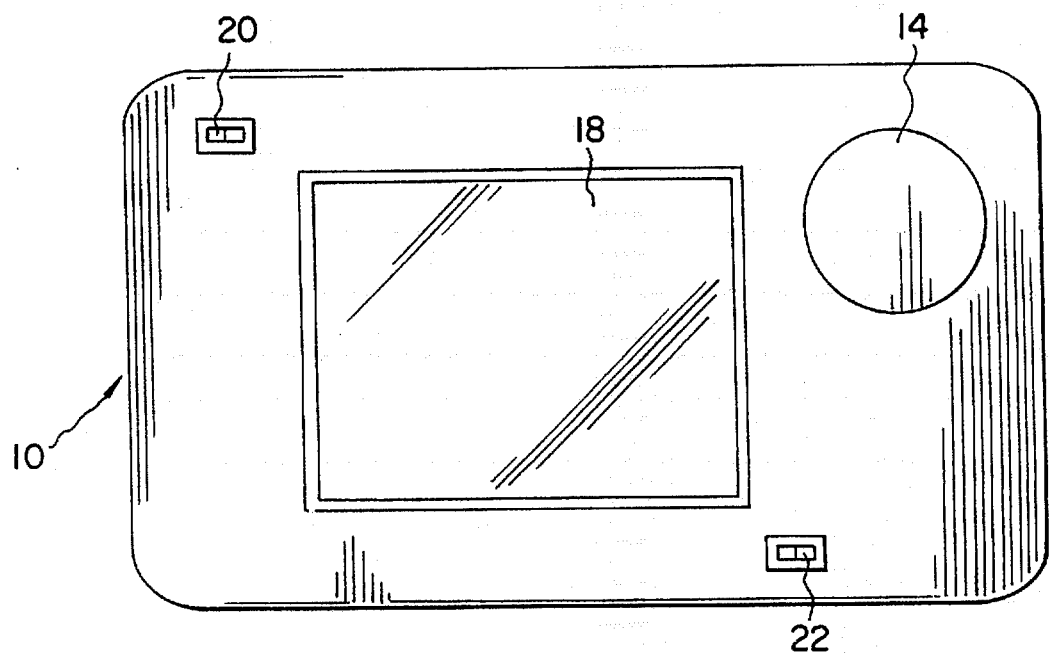
FIG. 5 is a rear view of the electronic camera shown in FIG. 1.

The printer 12 includes a light tight storage structure for receiving a stack of photosensitive sheets disposed relative to a camera opening as will be described shortly. The printer 12 has an active latch 24 and a passive latch 28 that permits the printer to be secured over the camera display 18. In this embodiment the latches 24 and 28 are hooked and by matching detail to sockets 20 and 22 of electronic camera 10. The rear view of the camera in FIG. 5 shows the position of the active socket 20 and the passive socket 22 and camera display 18. A latch driver 26 permits the selective securing and release of printer 12 from electronic camera 10 under control of printer electronics 30. A compliant, light tight mask is disposed on the printer 12 and forms a light tight interconnection to camera display 18.

Figure 3:
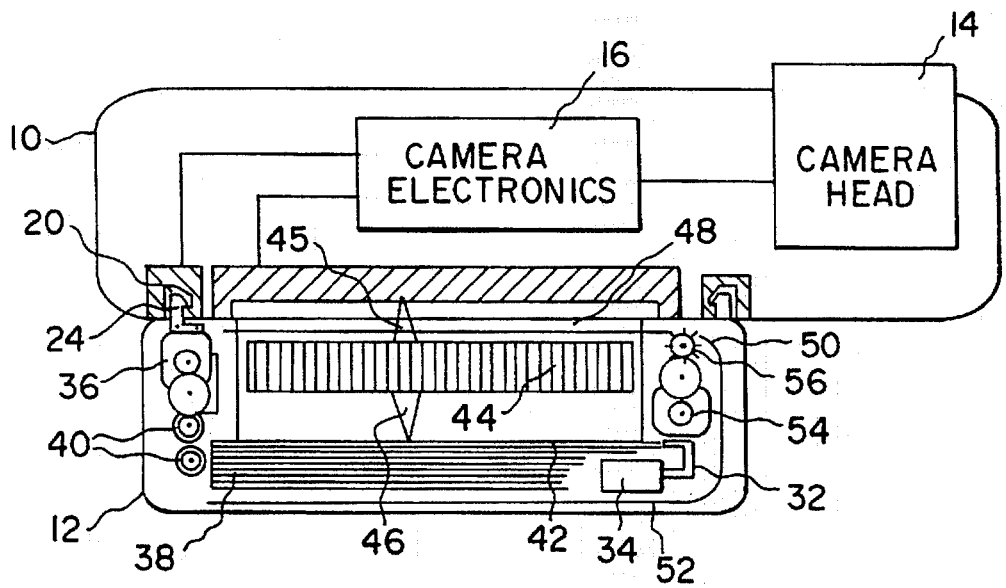
FIG. 3 shows the printer of FIG. 2 attached to the camera of FIG. 1.

FIG. 3 shows printer 12 secured to electronic camera 10. The printer 12 contains a stack of media sheets 38. These sheets are light sensitive and are loaded into the camera and stored in light sensitive manner as is known in the art. Photosensitive sheets can be found in current art as instant silver-halide sheets or pressure sensitive microencapsulated crushable color particles such as disclosed in U.S. Pat. Nos. 4,768,050, 5,049,902, and 5,122,432. Alternatively, images can be stored on photographic film and then stored and chemically processed at a later time.

Figure 6A:
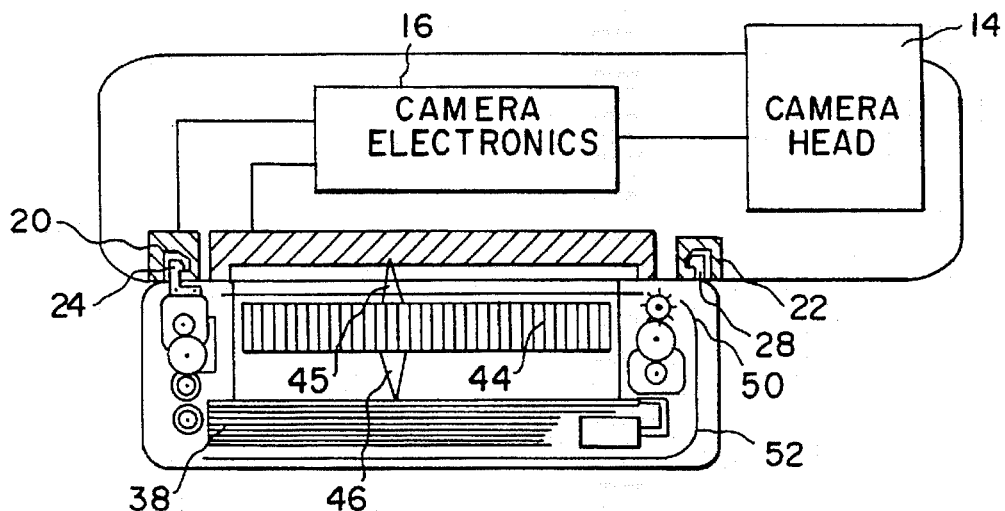
FIGS. 6a, 6b, and 6c show an operating sequence of the camera printer arrangement.
Figure 6B:
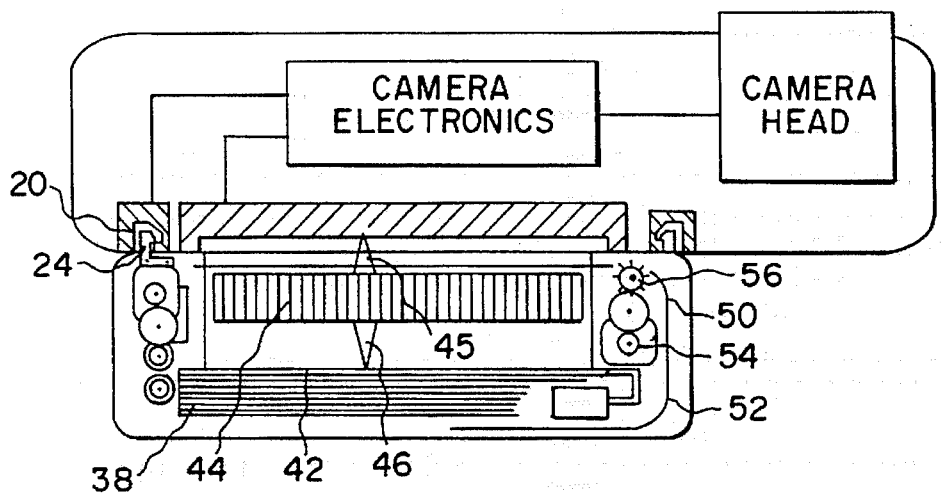

Light from the camera display 18 passes through a printer opening 48 to permit light to fall onto photosensitive sheet 42 within the printer 12. A shutter member 50 prevents photosensitive sheet 42 from exposure by covering printer opening 48. Shutter member 50 is a light opaque, compliant sheet that is free to travel shutter path 52 formed within printer 12. Shutter member 50 can be a 200 micron thick sheet of stainless steel, which has a black oxide plating. The use of stainless steel provides a light tight cover that is flexible. A black oxide coating or paint prevent extraneous light from fogging photosensitive sheet 42. As shown in FIG. 6a, the shutter member 50 is a flexible light-opaque sheet which, when the shutter member 50 is in its first position, over the photosensitive surface of the sheet. When the shutter member 50 is moved to its second, or open, position, it is driven along a shutter path 52 so that it no longer covers the photosensitive surface of the sheet. As shown in FIG. 6b, the shutter member 50 is actually moved to a position where much of it is under the sheet furthest from the opening. The printer has a printer opening 48 disposed relative to the camera display 18 for permitting light images from the camera to pass through the printer opening 48 and expose a photosensitive surface of a photosensitive sheet. The shutter member 50 is disposed relative to the printer opening and is movable between the first sheet covering position and the second sheet exposing position.

Figure 4:
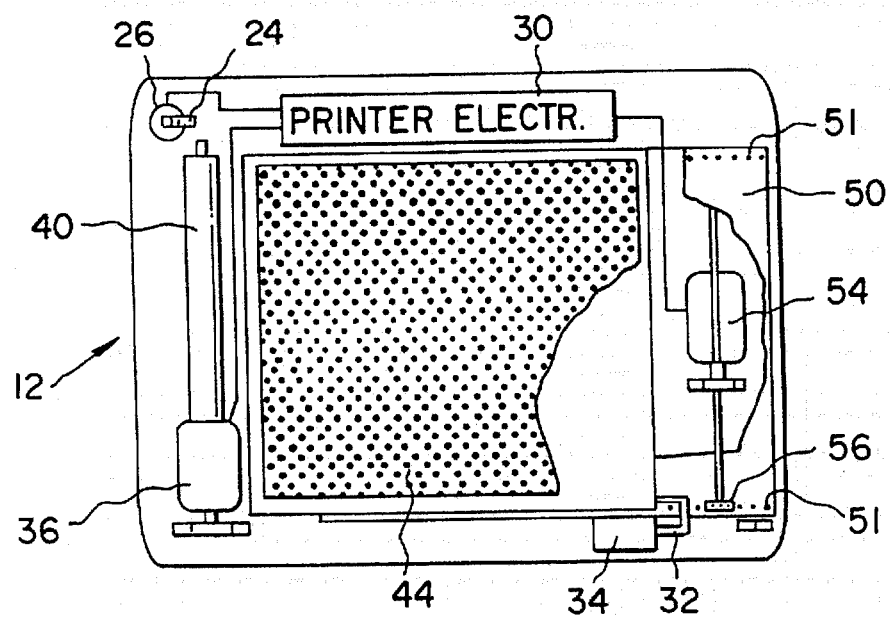
FIG. 4 is a front sectional view showing portions of the printer of FIG. 2.

Turning to FIG. 4, it can be seen that shutter member 50 has a set of shutter perforations 51 formed on either side of shutter 50. Location of shutter member 50 is controlled by shutter drive 54, which operates on sprockets 56 to move shutter member 50 through shutter path 52 under control of printer electronics 30. Shutter path 52 guides shutter member 50 in a path around the media to provide a small printer size.

After exposure of photosensitive sheet 42, picker 32 is moved by picker drive 34 to urge photosensitive sheet 42 into processing rollers 40. Processing rollers 40 are driven by roller drive 36 under control of printer electronics 30.

Printing optic 44 is used to focus an image onto photosensitive sheet 42. The printing optic 44 focuses a display area from the camera display 18 onto a photosensitive surface of the sheet 42 nearest the opening, after the shutter member 50 is moved to its second, or exposing, position. Printing optic 44 can be an array of gradient index rods that have been formed into a two dimensional array. Printing optic 44 can be formed from Nippon Sheet Glass rod lens array type 20B which has a total conjugate 15.1 mm. The actual dement is 6.89 mm tall and first working distance 45 and second working distance 46 are 4.10 mm.

The sockets and latches are dimensionally controlled to align printing optic 44 with the light emitting elements of camera display 18. First working distance 45 should be located by the interface to focus on the light emitting elements of camera display 18. Second working distance 46 is provided for forming an image on the imaging surface of photosensitive sheet 42 as it lies on platen 35. Printing optic 44 is accurately positioned relative to the display when the printer is secured to the electronic camera 10.

Signals from printer electronics 30 are transmitted through an interface formed by active latch 24 and active socket 20. The control signals are received by camera electronics 16. Camera electronics 16 turns camera display on and off under the control of printer electronics 30. Printer electronics 30 turns off the display and operates shutter drive 54 to move shutter member 50 along shutter path 52 to expose photosensitive sheet 42 to darkened camera display 18. Further signals from printer electronics 30 cause camera electronics 16 to reactivate camera display 18. A third transmission turns camera display 18 off to prevent further exposure of photosensitive sheet 42. After exposure, photosensitive sheet 42 is urged by picker 32 into processing rollers 40. Processing rollers 40 are turned by process roller drive 36 to process the latent image formed on photosensitive sheet 42.

In the case of silver halide imaging, a pod of chemicals at the beginning of photosensitive sheet 42 is burst by processing rollers 40. The chemicals are spread across the image of photosensitive sheet 42 as photosensitive sheet 42 passes through processing rollers 40. Said chemicals operate on the latent image to create a permanent colored dye image on photosensitive sheet 42. In the case of crushable media, the rollers apply pressure to micro-beads containing the latent image. Burst micro-beads release dye chemistries onto photosensitive sheet 42 to create a permanent color image.

Figure 6C:
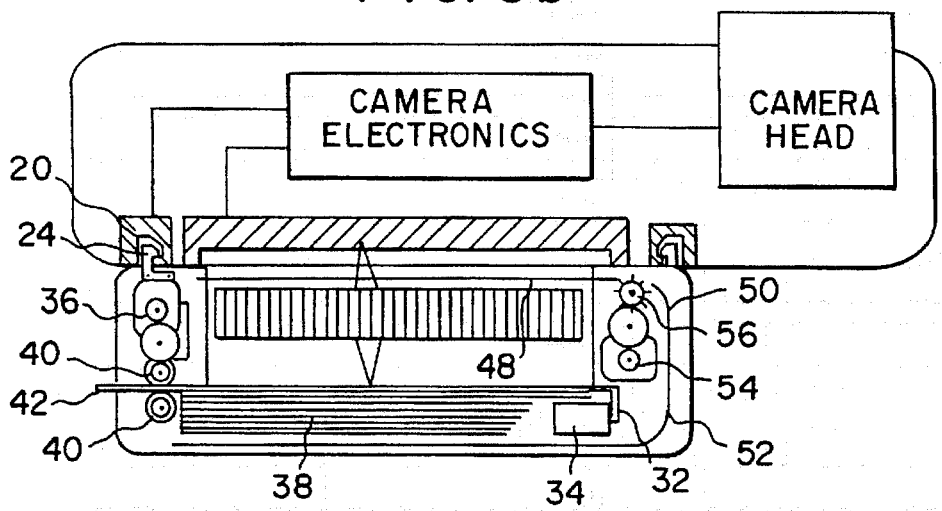

Operation of the invention is shown in FIGS. 6a–6c. An operator has mounted printer 12 onto electronic camera 10. Latches 24 and 28 automatically secure printer 12 in a light tight manner to camera display 18 on electronic camera 10. The operator signals the start of printing using printer electronics 30. Printer 12 signals camera electronics 16 to turn off camera display 18. Printer electronics 30 then activate shutter drive 54 and move shutter member 50 through shutter path 52 to expose photosensitive sheet 42 to camera display 18. In FIG. 6b sensors (not shown) detect that shutter member 50 is fully retracted Printer electronics 30 then signals camera electronics 16 turn camera display 18 on for a time period providing proper exposure of photosensitive sheet 42. Printer electronics 30 is aware of the light sensitivity of photosensitive sheet 42 and sets exposure time correspondingly.

FIG. 6c shows the system after exposure of photosensitive sheet 42. Camera display 18 is off. Printer electronics 30 activates shutter drive 54 to urge shutter member 50 through shutter path 52 to re-seal printer opening 48. Picker 32 moves under the actuation of picker drive 34 to move photosensitive sheet 42 into rotating processing rollers 40. Processing rollers 40 grip and drive photosensitive sheet 42 out of printer 12, providing the operator with a permanent color record of camera display 18.

The use of the latch driver 26 under the control of printer electronics 30 ensures that printer 12 is not detached from electronic camera 10 during image transmission from camera display 18. An operator detaches printer 12 from electronic camera 10 using an interface to printer electronics 30 such as a conventional switch. Printer electronics 30 then activates latch driver 26 to permit removal of printer 12 from electronic camera 10.

In operation, the active socket 20 provides communication between the electronic camera and the printer so that the display image is imaged onto the photosensitive sheet after the shutter member 50 is moved from its first to its second position. After film exposure, the shutter member 50 is returned to its first covering position.

The invention has been described in detail with particular reference to a certain preferred embodiment thereof, but it will be understood that variations and modifications can be effected within the spirit and scope of the invention.

Parts List 10 electronic camera
12 printer
14 camera head
16 camera electronics
18 camera display
20 active socket
22 passive socket
24 active latch
24a detail
26 latch driver
28 passive latch
30 printer electronics
32 picker
34 picker drive
36 roller drive
38 media sheets
40 processing rollers
42 photosensitive sheet
43 cover sheet
44 printing optic
45 first working distance
46 second working distance
48 printer opening
50 shutter member
51 shutter perforations
52 shutter path
54 shutter drive
56 sprockets

I claim:

1. Apparatus for capturing and printing images on photosensitive sheets, comprising:
   (a) a camera for electronically storing an image of a subject and having a display for displaying such stored image;
   (b) a printer including light tight storage means for receiving a stack of photosensitive sheets;
   (c) means for imaging the display image onto a photosensitive sheet including:
      (i) the printer having a printer opening disposed relative to the camera display for permitting light images from the camera to pass through the opening and expose a photosensitive surface of a photosensitive sheet;
      (ii) shuttering means disposed relative to the printer opening and being movable between a first sheet covering position and a second sheet exposing position;
      (iii) optical means for focusing a display area onto said photosensitive sheet; and
   (d) means for providing electronic communication between the electronic camera and the printer so that the display image is imaged onto the photosensitive sheet after the shutter means is moved from its first to its second position.

2. Apparatus for capturing and printing images on photosensitive sheets, comprising:
   (a) an electronic camera for electronically storing an image of a subject and having a display for displaying such stored image;
   (b) a printer including light tight storage means for receiving a stack of photosensitive sheets;
   (c) means for imaging the display image onto a photosensitive sheet including:
      (i) the printer having a printer opening disposed relative to the camera display for permitting light images from the camera to pass through the opening and expose a photosensitive surface of a photosensitive sheet;
      (ii) shuttering means disposed relative to the printer opening and being movable between a first sheet covering position and a second sheet exposing position;
      (iii) optical means for focusing a display area onto said photosensitive sheet; and
   (d) means for providing electronic communication between the electronic camera and the printer so that the display image is imaged onto the photosensitive sheet after the shutter means is moved from its first to its second position.

3. The apparatus of claim 2 wherein the communication means further includes an active socket which includes electronic sensing circuitry for communicating with the printer.

4. The apparatus of claim 2 wherein the communication means further includes an active socket which includes electronic sensing circuitry for communicating with the printer.

5. The apparatus of claim 2 further including means for preventing the printer unit from being detached from the camera when there is electronic communication between the display and the print head.

6. The apparatus of claim 2 wherein the optical means includes rod lens arrays.

7. The apparatus of claim 2 wherein said shutter means includes a shutter member comprising a flexible light-opaque sheet which, when the shutter member is moved to its second position, it is driven along a shutter path so that it no longer covers the photosensitive surface of the sheet.

* * * * *